July 11, 1944.  C. SCHETTLER ET AL  2,353,506
COLOR PHOTOGRAPHY
Original Filed Jan. 22, 1940  3 Sheets-Sheet 1
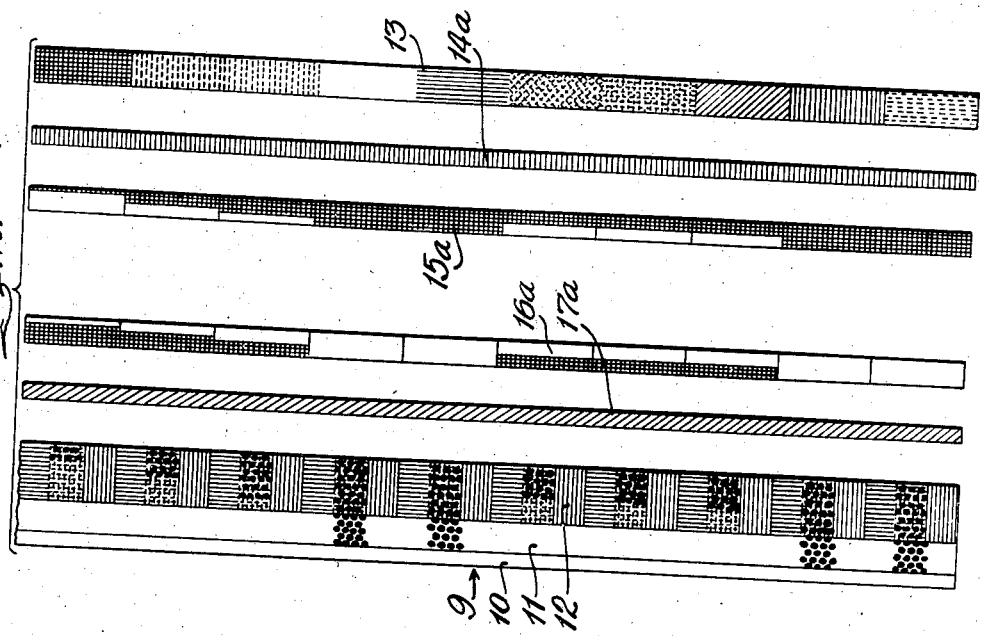
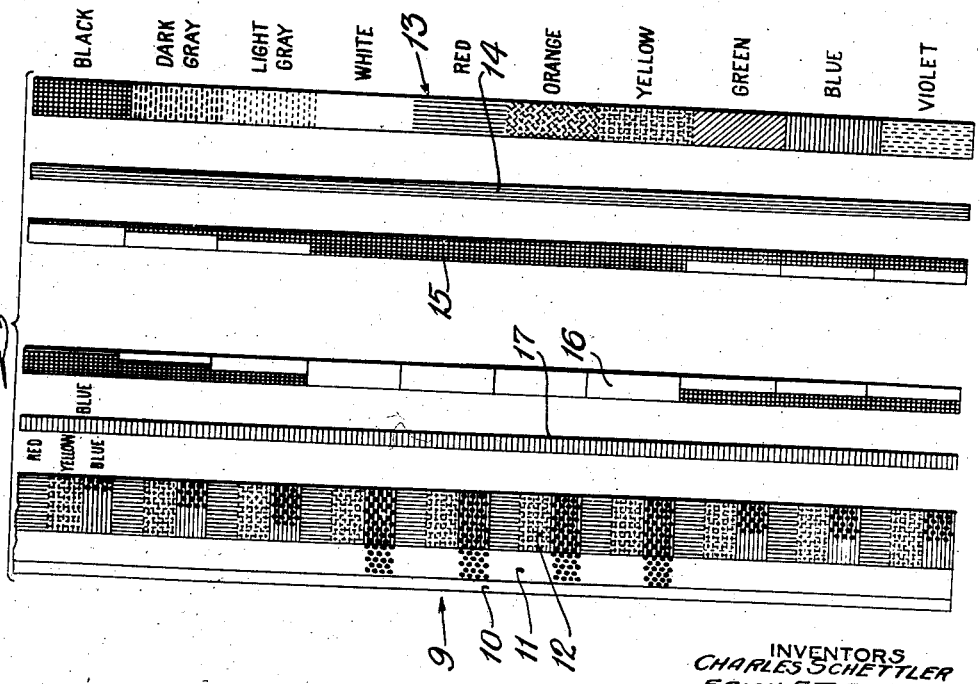
INVENTORS
CHARLES SCHETTLER
ERICH F. T. SCHENK
BY
Hornidge and Dowd
ATTORNEYS

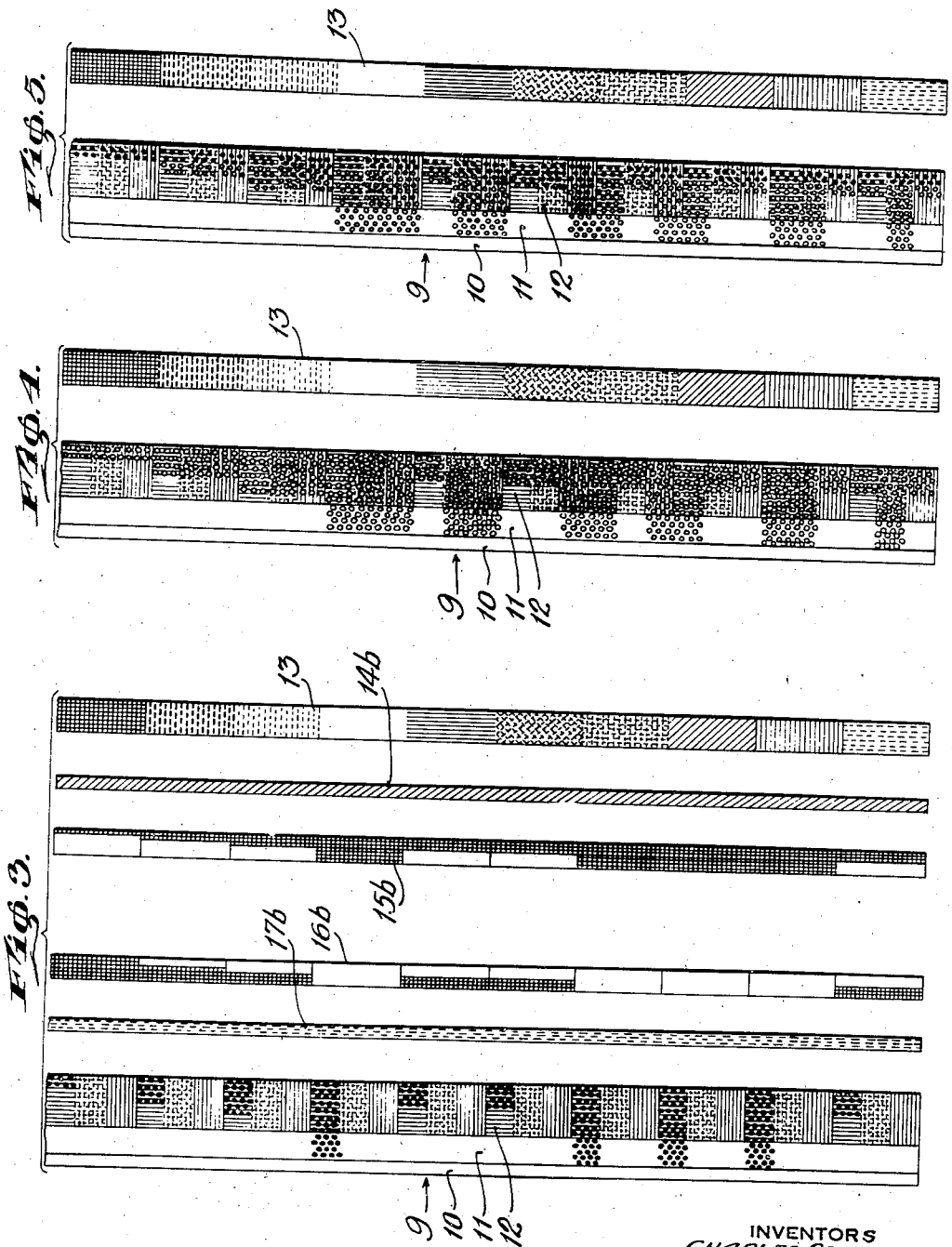

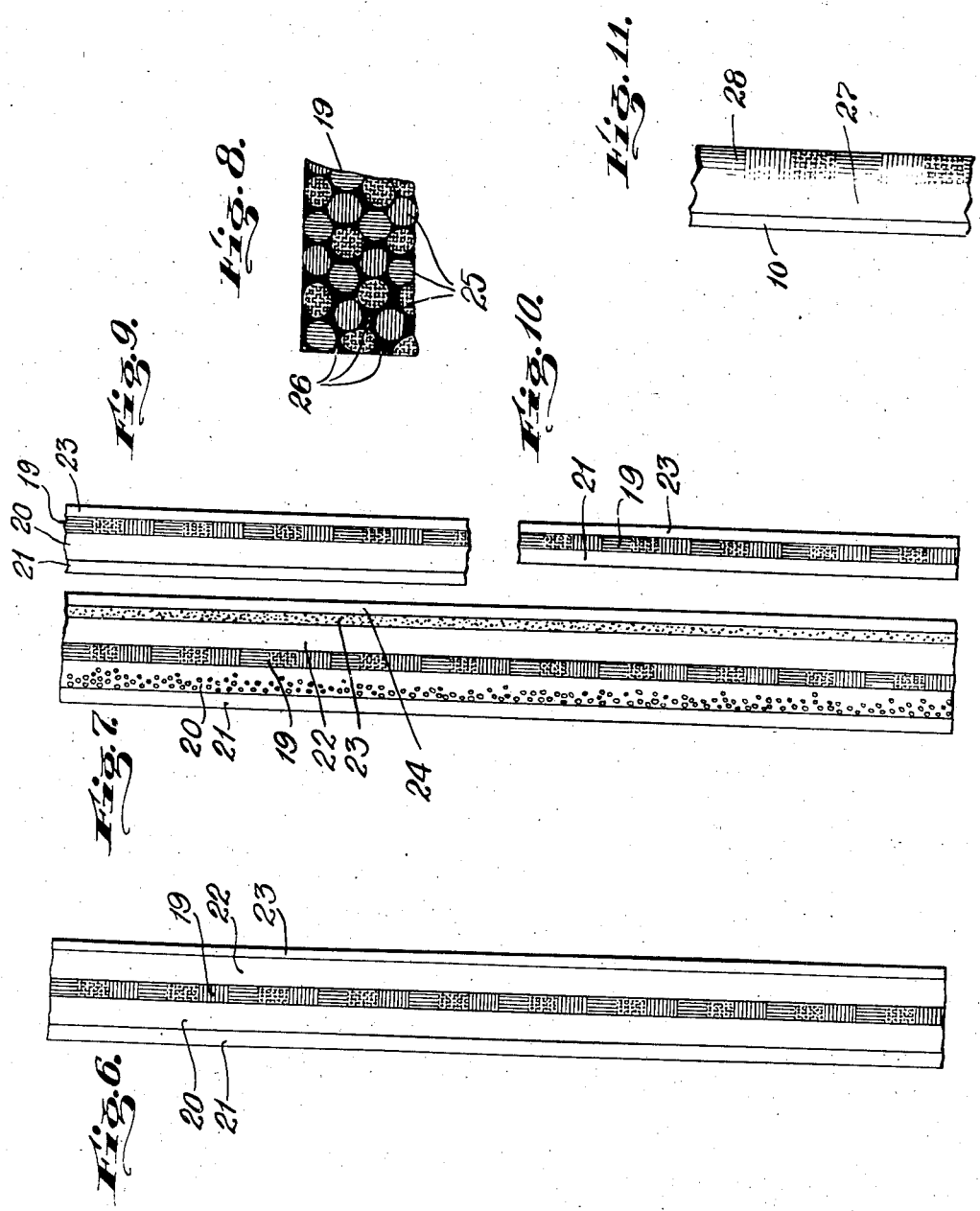

Patented July 11, 1944

2,353,506

UNITED STATES PATENT OFFICE 2,353,506

COLOR PHOTOGRAPHY

Charles Schettler and Erich F. T. Schenk, Miami, Fla.

Original application January 22, 1940, Serial No. 314,995. Divided and this application September 1, 1942, Serial No. 456,860

9 Claims. (Cl. 95—2)

This invention relates to color photography and one of its objects is to provide a photographic print in colors to be viewed by reflected as distinguished from transmitted light, in which the various color densities will be reproduced with greater fidelity and brilliance than is possible with methods heretofore used, and in accomplishing this we make use of image forming light reflective white particles distributed in varying amounts of concentration and depth within a medium which itself may be multi-colored to reflect the incident light, or a separate multi-colored filter is used in cooperation with said white particles. This invention relates more particularly to the method involved in the production of such color prints, this case being a division of our application, Serial Number 314,995, filed by us on January 22, 1940.

Other and further objects and advantages of our invention will be apparent from the following description of it, taken in connection with the accompanying drawings in which Fig. 1 is a greatly enlarged cross sectional view of a multi-colored screen film at one stage of operation and a diagrammatic representation of the several steps involved in arriving at that stage.

Fig. 2 is similar to Fig. 1 showing said film at a subsequent stage of operation.

Fig. 3 is similar to Figs. 1 and 2 showing said film at a further stage of operation.

Fig. 4 is a greatly enlarged cross sectional view of the multi-colored screen film of Figs. 1, 2 and 3 at a further stage of operation.

Fig. 5 is similar to Fig. 4 showing the said film in its final form.

Fig. 6 is a greatly enlarged cross sectional view of an assembly of films used in a modified form of the invention.

Fig. 7 is similar to Fig. 6 showing said films upon the completion of the operations.

Fig. 8 is a face view greatly enlarged of one form of the multi-colored filter shown in Figs. 6 and 7.

Fig. 9 is a greatly enlarged cross sectional view of a modification of the film assembly shown in Fig. 6.

Fig. 10 is a greatly enlarged cross sectional view of a modification of the film assembly shown in Fig. 9.

Fig. 11 is a greatly enlarged cross sectional view of the multi-colored screen film of Fig. 1 before exposure, but of a somewhat modified construction.

In carrying out our invention, we make use preferably of a color screen film, designated generally by the numeral 9, consisting of a thin transparent support 10 of Celluloid, Cellophane, glass or other transparent material, having thereon a layer of a panchromatic light sensitive emulsion 11. Superimposed upon the layer 11 is a multi-colored light sensitive emulsion filter 12, consisting of variously dyed tiny portions arranged in any desired manner, such as in lines, squares, mixed dots and the like, forming in a minute pattern a screen through which the image passes to reach the silver salts contained therein and in the emulsion layer 11.

The layers 11 and 12, instead of being formed separately, may consist of a single layer 27 (Fig. 11), to which the color pattern 28 may be applied by dyes which partially penetrate the emulsion to a substantial depth, or again, the layers 11 and 12 may be provided by an assembly of two films each having its own independent transparent support.

The final photographic print to be produced in accordance with our invention may involve the well known combinations of two, three or more colors, and if, as we prefer, a three color process is used, the colors of the emulsion 12 are preferably red, blue and yellow. The dyes used for producing the said multi-colored emulsion 12 should be such that the colors will not be affected by the chemicals used in the processing to be done later, or they may be such that one or more of the colors will be changed to the desired colors in the course of such processing. For instance, a dye of a different color can be used for the yellow portions of the emulsion filter in order to secure, in a given instance, a better separation of colors during exposure, and the said portions later changed to the desired yellow color. The light sensitive particles of silver salts in the filter emulsion layer 12 need not be sensitive to all colors but should be sensitive to the respective colors in which they are embedded.

The scene or objects 13 which are to be reproduced in their natural colors in a print in accordance with our invention are first photographed separately and successively through a red, a blue and a green filter, designated in Figs. 1, 2 and 3 by the numerals 14, 14a and 14b, and from the three black and white color separation negatives 15, 15a and 15b thus obtained, a set of three transparent black and white separation positives 16, 16a and 16b are then successively printed on the film 9 either by contact or projection with an appropriate color filter 17, 17a and 17b interposed in the light path and with the film 9 positioned so that the multi-colored emulsion filter side of the film 9 is towards said positives, or in other words the layer 12 is between the layer 11 and the light source. A blue filter 17 is used in printing from the positive 16 of a negative 15 made through a red filter 14. A green filter 17a is used in printing from the positive 16a of the negative 15a made through a blue filter, and a violet filter 17b is used in printing from the positive 16b of the negative 15b made through a green filter 14b. It is obvious that care must be exercised to secure exact registration of the three images as they are successively printed on the film 9. After these exposure operations have been completed, the film 9 is then developed, washed, fixed and washed again, all in accordance with standard practice.

The resultant effect of each of these operations upon the film 9 is shown diagrammatically in Figs. 1, 2 and 3, respectively. Where, as is shown in Fig. 1, the scene 13 is composed of different colors, such as violet, blue, green, yellow, orange and red, as well as white, light gray, dark gray and black and is photographed through the red filter 14, the color separation positive 16, made from the negative 15 will appear substantially transparent in the areas upon which the white, red, orange and yellow colored images fell, due to the presence of practically no converted metallic silver in these areas, the black, dark gray and light gray images will be represented by relative degrees of density in said positive, and the blue, green and violet images will appear as half tones or midway between transparent and opaque. This positive is then printed on the film 9 through a blue filter 17 and the various amounts of blue light produced by the various densities of the said positive 16 will affect substantially only the silver salts in the film 9 embedded in the blue dyed portions in the emulsion 12 and in those portions of the panchromatic emulsion 11 immediately behind said blue dyed portions to a depth and concentration inversely proportionate to the various densities of the said positive 16. The color separation positive 16a printed from the negative 15a obtained by photographing the same scene 13 through a blue filter 14a will appear substantially transparent in the areas upon which the white, red, blue and violet images fell due to the presence of practically no converted metallic silver in these areas, the black, dark gray and light gray images will be represented by relative degrees of density in said positive, and the orange, yellow and green images will appear as half tones or midway between transparent and opaque. This positive is printed on the film 9 through a green filter 17a and the various amounts of green light produced by the varying densities of the said positive 16a affect substantially only the silver salts in the film 9 embedded in the yellow dyed portions in the emulsion 12 and in those portions of the panchromatic emulsion 11 immediately behind said yellow dyed portions to a depth and concentration inversely proportionate to the various densities of the said positive 16a. The color separation positive 16b printed from the negative 15b obtained by photographing the same scene 13 through a green filter 14b will appear substantially transparent in the areas upon which the white, yellow, green and blue images fell due to the presence of practically no converted metallic silver in these areas, the black, dark gray and light gray images will be represented by relative degrees of density in said positive, and the red, orange and violet images will appear as half tones or midway between transparent and opaque. This positive is printed on the film 9 through a violet filter 17b, and the various amounts of violet light produced by the various densities of the said positive 16b will effect substantially only the silver salts in the film 9 embedded in the red dyed portions of the emulsion 12 and in those portions of the panchromatic emulsion 11 immediately behind said red dyed portions, to a depth and concentration inversely proportionate to the various densities of the said positive 16b.

The aggregate effect of these several operations on the film 9 when it has been developed and fixed is that the depth and concentration of the particles of converted metallic silver in the emulsions 11 and 12 vary in accordance with the various intensities of the light transmitted onto the film through the three color separation positives and their accompanying filters. In some instances only the silver salts in the emulsion filter 12 have been affected and then to different extents, while in other instances the light has been intense enough to affect not only the silver salts embedded in the related colored portions of the emulsion 12 but also those embedded in the portions of the panchromatic layer 11 behind them. It will be understood, of course, that known methods of control both in the making of the color separation negatives and positives and the printing of said positives on the film 9, such as the time of exposure, the time of development and other factors known and recognized in the photographic art, must be exercised in order to secure a proper contrast and density in the film 9.

The film 9 is next treated so as to change all the black metallic silver particles that remain in the panchromatic emulsion layer 11 and the multi-colored emulsion filter 12 into substantially white colored particles, which may be done by immersing said film in a suitable bath, such as the following:

Ammonium chloride _____ gr__ 90
Mercury bichloride _____ gr__ 112½
Water _____ oz__ 8¾ which will convert the black silver into white particles, as shown in Fig. 4.

By the term "white," however, we do not wish to confine ourselves to a pure white. Although the whiter the particles can be made the better the final results will be, providing thereby an increase of light reflectivity, but for this purpose a near-white is sufficient. Our use of this term, therefore, includes a shade approaching white and one that does not possess any color tint which would substantially alter the colors of the light reflected from the multi-colored filter 12 so as to interfere with the faithful reproduction of the colors of the original scene or objects photographed. It may be noted that if the exposure cannot give the desired control, the film can first be reduced to proper density and after a thorough washing the film may be subjected to the bath mentioned above.

As a final step, it is necessary to give the film 9 a backing of a light-absorptive and non-reflective quality (since the film is to be viewed through the transparent support 10, the surface containing the multi-colored emulsion filter 12 will constitute the back of said film), and this backing may be applied in any one of several ways, for instance, by a chemical such as a redeveloper in which the film may be immersed for a short period just sufficient to blacken the white particles lying just below the surface of the multicolored emulsion filter 12, the result of which is shown in Fig. 5, or by applying a black dye to said surface and allowing it to sink in to but a slight depth, or by cementing the film to a sheet of black opaque paper. The picture is viewed through the transparent support 10. For purposes of clarity Figs. 4 and 5 show the film 9 in juxtaposed relation to the scene or objects 13 which it represents. Either of the last two methods of providing the backing may be found to be preferable in the absence of sufficient silver particles in certain areas to provide a substantially complete black backing, such, for instance, where the image is that of a black object which produced but little actinic effect upon the silver salts.

It will be noted that it is the opaque white particles and their relative distribution throughout the film that gives form and color to the picture. For instance, if neither of the emulsion layers contained any of said white particles, theoretically no color would be reflected from the film since the black backing would absorb all the incident light. On the other hand, if the white particles were present in maximum density in the panchromatic layer the film would present merely a plain white surface. This is a condition that might obtain if the intensity of the printing light through each of the three filter colors above described was such as to affect all the silver salts in the panchromatic emulsion layer so as to provide no interstices between them to allow the passage of light to and from the white particles in the multi-colored emulsion filter 12. The greater the amount of white particles in the emulsion filter 12 the lighter will appear the respective colors in which they are embedded and these varying tones of color may thus extend all the way from a near-black to a pure white, which last tone is the result of a maximum of density of the white particles in the uncolored panchromatic layer as aforesaid. Consequently when the film 9 in the finished form as shown in Fig. 5 is viewed through the transparent support 10 it will be found to give an authentic pictorial reproduction of a scene in all its various tones of color, and this by a much simpler and less expensive method than any heretofore available for the production of a photographic print in color.

A modified form of our invention differs from the foregoing in that the material to constitute the finished color photograph, instead of such as the film 9, is, as shown in Fig. 6, made up of three units comprising a thin sheet 19 of transparent material, such as Celluloid, Cellophane, glass or the like which is variously colored, such as blue, red and yellow in a minute pattern of lines, squares, mixed dots or the like to form a multi-colored filter, the pigments used being of a permanent character which will be unaffected by any subsequent processing to which the photographic emulsions to be attached thereto are subjected. To one side of the sheet 19 is detachably secured by a transparent cement or otherwise a sheet of panchromatic film of a standard type comprising the support 20 and the emulsion 21. To the opposite side is similarly secured another sheet of standard panchromatic film comprising the support 22 and the emulsion 23. In practice we have found it advantageous, although not necessary, that the emulsion layer 23 be somewhat thinner than the emulsion layer 21.

This triplex unit is subjected to the same procedure in practicing our invention as the film 9, as hereinbefore described, in respect to the successive exposures to the color separation positives through their respective accompanying filters. When the films on the opposite sides of the color filter sheet 19 consist of similar panchromatic films either film may be positioned towards the color separation positives, but where their respective emulsions are of different thicknesses the film having the thinner emulsion 23 should be positioned towards the said positives. After the exposures have been completed, the two films are separated from each other, and the one that was on the side towards the color separation positives during the exposures is developed by a reversal process to change it from a negative to a positive. The other film that was on the opposite side of the color filter sheet 19 away from the color separation positives is developed, fixed and washed, after which it is treated, as hereinbefore described, with respect to the film 9, to change the black silver particles to a white color. The said two films and said multicolored filter are then reassembled permanently in their former position in exact registry with one another. A white light reflective backing 24 is applied to the film having the emulsion 23, which may be a white cardboard mount, leaving the picture to be viewed through the film having the emulsion 21. The result of this modified process is shown in Fig. 7 and provides a photographic color print in which the emulsion 23 in connection with the multi-colored filter will produce all the shades of the filter colors darker than said colors themselves extending down to black, while the emulsion 21 will at the same time produce, in accordance with the different degrees of density of the white particles, the several colors extending from normal up to white, and the combined effect will be to give a faithful color reproduction of the original scene photographed.

It is obvious that the assembly shown in Fig. 6 may be variously composed; for instance, instead of two separate films, each comprising a support and an emulsion, placed on either side of a multicolored filter, the multi-colored filter may form the support for one of said emulsions, for instance, the emulsion 23, as shown in Fig. 9, the other emulsion 21 having its own independent support, or the multi-colored filter may form the support for both emulsions, as shown in Fig. 10. In the latter case, since each of the emulsions is to be subjected to different treatments, it will be necessary during such treatments to cover one emulsion with a protective coat or varnish or like substance impervious to the processing agents used in treating the other emulsion, which coating may be removed in order to treat that emulsion next, the other emulsion being then protected in the same way. This use of a protective coating may be dispensed with in the step wherein the black particles are changed to white, so that both emulsions may be given the same treatment, and the emulsion that was positioned towards the color separation positives may be afterwards treated by applying to it a blackening solution, such as a developer with a brush or swab, to restore the white particles in that emulsion to their original black color. Where separable films are used the final white reflecting backing may be provided by not making the film having the emulsion 23 a reversed positive but developing it as a negative and printing it on another film having a white reflecting back. Where the two emulsions form separable film units as shown in Fig. 6, they may also be exposed separately, and, with the aid of registration marks placed thereon and maintained throughout the various steps, the several units may be satisfactorily matched in their final assembly, the obviously necessary care being taken to keep the apparatus and other items in the same position throughout the various steps.

In the preparation of the multi-colored filter 19, particularly when the tiny colored areas are in the form of round dots or other shapes so that one is not contiguous to others throughout its perimeter but uncolored areas are interpersed among them, we have found that such uncolored or clear areas permit many rays of light unfiltered by the filter 19 to fall upon the emulsion 21 during exposure and therefore produce in the final result a greater amount of white particles than would otherwise obtain and upset somewhat the color balance in the print relative to the colors of the original scene or objects. To remedy this condition in the case of such a filter we fill the areas between such colored dots, 25, as shown in Fig. 8, with an opaque water soluble substance indicated by the numeral 26, so that during the exposure the only light that reaches the emulsion 21 is that which passes through the multi-colored dots comprising the filter 19. In the subsequent processing this substance is dissolved out leaving said areas 26 clear and transparent.

Other methods may be used to render the said areas opaque during exposure. For instance, the filter 19 may have applied to it an emulsion adapted for the well-known wash-off gelatine relief methods, such as, for instance, a bichromated gelatine, which is then exposed to light from the other side. The result of this will be to harden this gelatine emulsion in the areas between the colored dots of the filter while the areas in register with the colored dots, being less exposed, may be washed out, leaving the gelatine in relief behind the said intervening areas. In doing this it may be advantageous to make use of an additional filter to amplify the relative hardening of the gelatine between the intervening clear areas and those in register with the colored dots. The hardened relief portions of the gelatine corresponding to the said intervening clear areas may be then rendered opaque by the application of a suitable water soluble pigment, and the filter 19 is then ready for use in making the exposures as above described, after which these opaque areas may be then washed out leaving these areas clear and transparent.

Another method for thus preparing the filter 19 would be to expose a separate film through the filter 19 and so that the resultant negative would have a high degree of density, approximating complete opacity, only in the areas corresponding to the intervening clear areas in the filter and the negative thus produced may be used as a mask in conjunction with the colored dot filter in making the exposures, after which it is discarded in assembling the final print. Instead of a separate film being used to constitute such a mask it may be an emulsion applied to the colored dot filter, which after the exposures have been made may be stripped off.

These clear areas in the multi-colored filter 19, although very small in comparison with the colored areas, have an advantage in that they not only obivate the presence of dark spots in the finished print caused by an excess of the opaque white particles in the emulsion 21 in these areas, but also add to the brilliancy of the finished print, since the incident light passing freely through said clear areas will in a large measure be reflected back through the colored dots in the filter 19.

A further modification of our invention would be to substitute for the emulsion 21, one such as is used in the wash-off gelatine relief process, for instance, a bichromated gelatine, having embedded therein a mass of minute opaque white particles uniformly dispersed throughout the gelatine and of a material that will not be affected by the subsequent steps of the wash-off relief process, except that they will wash off with the portions of the gelatine in which they are embedded. After the exposure through the filter 19 as above described and the washing off of the parts of the gelatine which have not been hardened, the remainder of the gelatine layer and the said white particles embedded therein will have similar characteristics to the silver emulsion 21 after the black silver particles have been transformed to white particles as hereinbefore described. Again, the emulsion 21 may be one containing silver salts which after the exposure is separately developed as a negative. From this a positive print is made on a film provided with the said gelatine layer containing the said white particles, which is then processed by the wash-off relief method. This print is then assembled with the filter 19 and the positive film 22—23 and mounted on a light reflective support 24 as above described, to constitute the finished print.

It is obvious that many other changes may be made in our invention without departing from the spirit thereof as defined in the appended claims, and while we have described our invention in connection with a three color process, it is obvious that it is applicable to a two color process or to one utilizing more than three colors.

What we claim is:

1. The method of making a photographic color print to be viewed by reflected light which includes the successive steps of exposing a sensitive film provided with a sensitive inner layer of a silver salt emulsion and a sensitive outer layer composed of a transparent additive color-screen filter silver salt emulsion, through said color-screen filter to a series of color separation photographic images with light of different colors, developing and fixing said film, and converting the metallic silver image to a substantially white image.

2. The method of making a photographic color print which includes the steps of exposing a sensitive film provided with an inner layer of a panchromatic emulsion and an outer sensitive layer composed of a transparent additive color-screen filter silver salt emulsion through said color-screen filter to a series of color separation photographic images with light of different colors, developing and fixing said film, converting the metallic silver image to a substantially white image and mounting said film emulsion side down upon a substantially black backing.

3. The method of making a photographic color print upon a light sensitive film composed of a panchromatic emulsion and an overlying layer consisting of a light sensitive transparent additive color-screen filter emulsion, which includes exposing said film through said color-screen filter to a series of color separation photographic images with light of different colors, converting the image defining particles contained in said emulsions after developing and fixing, into substantially white particles, and applying to the outer side of said color-screen filter emulsion a substantially black backing.

4. The method of making a photographic color print which includes exposing a panchromatic film which throughout the length and breadth and for a substantially uniform portion of the thickness of its emulsion layer consists of a transparent additive color-screen filter, through said color screen filter, successively to light of different colors, developing and fixing said film, converting the silver particles contained in said film into substantially white particles, and applying a substantially black backing behind the colored face of said film.

5. The method of making a photographic color print to be viewed by reflected light which includes exposing a sensitive film provided with an inner layer of panchromatic emulsion and a sensitive outer layer of a silver salt emulsion in which is embodied a transparent additive color-screen filter, through said color-screen filter, to a series of color separation photographic images with light of different colors, developing and fixing said film, converting the metallic silver image to a substantially white image and applying a substantially black backing behind the emulsion side of said film.

6. The method of making a photographic color print which includes the steps of exposing a sensitive film provided with an inner layer of a panchromatic emulsion and an outer sensitive layer composed of a transparent additive color-screen filter silver salt emulsion through said color-screen filter to a series of color separation photographic images with light of different colors, developing and fixing said film, converting the metallic silver image to a substantially white image and rendering the emulsion surface of said film substantially black.

7. The method of making a photographic color print to be viewed by reflected light which includes exposing a sensitive film provided with an inner layer of panchromatic emulsion and a sensitive outer layer of a silver salt emulsion in which is embodied a transparent additive color-screen filter, through said color-screen filter, to a series of color separation photographic images with light of different colors, developing and fixing said film, converting the metallic silver image to a substantially white image and applying a substantially black backing to the rear surface of said inner layer.

8. The method of making a photographic color print to be viewed by reflected light which includes exposing a sensitive transparent additive color-screen filter silver salt emulsion layer to a series of color separation photographic images, developing and fixing said emulsion layer, and converting the metallic silver image therein to a substantially white image.

9. The method of making a photographic color print to be viewed by reflected light which includes the successive steps of making black and white color separation negative films of the subject photographed through red, blue and green filters respectively, making black and white color separation positive films from said negatives, exposing a sensitive film provided with an inner layer of panchromatic emulsion and a sensitive outer layer composed of a transparent additive color-screen filter silver salt emulsion in red, yellow and blue colors, through said color-screen filter successively to the said red color separation positive with blue light, to the said blue color separation positive with green light, and to the said green color separation positive with violet light, developing and fixing said film, converting the metallic silver image embedded therein to a substantially white image and mounting said film emulsion side down upon a substantially black backing.

CHARLES SCHETTLER.
ERICH F. T. SCHENK.